ized States Patent US 11,424,965 B2
Manolakos et al. Aug. 23, 2022

(12) United States Patent (10) Patent No.: US 11,424,965 B2
Manolakos et al. (45) Date of Patent: Aug. 23, 2022

(54) SOUNDING REFERENCE SIGNAL COMPATIBILITY

(71) Applicant: QUALCOMM Incorporated, San Diego, CA (US)

(72) Inventors: Alexandros Manolakos, San Diego, CA (US); Le Liu, Fremont, CA (US); Alberto Rico Alvarino, San Diego, CA (US); Joseph Binamira Soriaga, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 16/912,333

(22) Filed: Jun. 25, 2020

(65) Prior Publication Data
US 2020/0412582 A1 Dec. 31, 2020

Related U.S. Application Data

(60) Provisional application No. 62/868,469, filed on Jun. 28, 2019.

(51) Int. Cl.
*H04W 72/04* (2009.01)
*H04L 25/02* (2006.01)
*H04L 5/00* (2006.01)
*H04L 27/26* (2006.01)

(52) U.S. Cl.
CPC ........ *H04L 25/0226* (2013.01); *H04L 5/0051* (2013.01); *H04L 27/2613* (2013.01); *H04W 72/0446* (2013.01); *H04W 72/0466* (2013.01)

(58) Field of Classification Search
CPC ......... H04W 72/0446; H04W 72/0466; H04W 72/1289; H04W 24/10; H04L 25/0226; H04L 5/0051; H04L 27/2613
See application file for complete search history.

(56) References Cited

U.S. PATENT DOCUMENTS 9,572,063 B2 * 2/2017 Etemad ................ H04L 45/306
2017/0048717 A1 2/2017 Yoo et al.
2017/0288897 A1 * 10/2017 You ....................... H04W 4/029
(Continued)

FOREIGN PATENT DOCUMENTS

WO 2019125062 A1 6/2019

OTHER PUBLICATIONS

International Search Report and Written Opinion—PCT/US2020/039781—ISA/EPO—dated Sep. 30, 2020.
(Continued)

*Primary Examiner* — Wei Zhao
(74) *Attorney, Agent, or Firm* — Procopio, Cory, Hargreaves & Savitch

(57) ABSTRACT

Techniques for compatibility between UEs that transmit SRS in only an existing SRS region and UEs that can transmit SRS using resources in an existing SRS region, an added SRS region, or both. Techniques for frequency domain subbband hopping using counters or subband hop shifts are disclosed. Techniques for compatibility for SRS transmissions that can use different scrambling sequence IDs, comb types, sequence/group hopping, and open loop power control are disclosed.

28 Claims, 15 Drawing Sheets

(56) References Cited

U.S. PATENT DOCUMENTS

2018/0020441 A1   1/2018   Lo
2021/0385039 A1*  12/2021  Cha .................. H04W 8/22

OTHER PUBLICATIONS

Qualcomm Incorporated: "Virtual Cell ID for SRS", 3GPP Draft, R1-1902381, 3GPP TSG-RAN WG1 #96, SRS Virtual Cell ID, 3rd Generation Partnership Project (3GPP), Mobile Competence Centre, 650, Route Des Lucioles, F-06921, Sophia-Antipolis, Cedex, France, vol. RAN WG1, No. Athens, Greece, Feb. 25, 2019-Mar. 1, 2019, Feb. 16, 2019 (Feb. 16, 2019), XP051600077, 3 Pages, Retrieved from the Internet: URL:http://www.3gpp.org/ftp/tsg%5Fran/WG1%5FRL1/TSGR1%5F96/Docs/R1%2D1902381%2Ezip [retrieved on Feb. 16, 2019], p. 1, Paragraph 2, p. 2, Paragraph 3, p. 3, Paragraph 4.

* cited by examiner

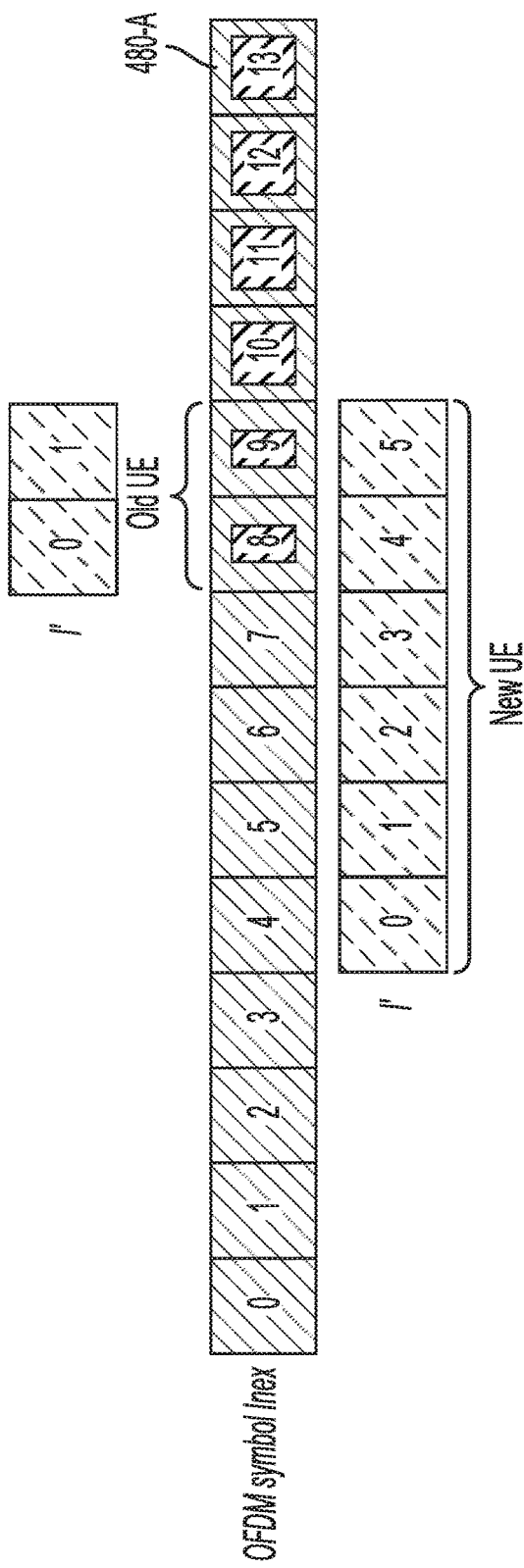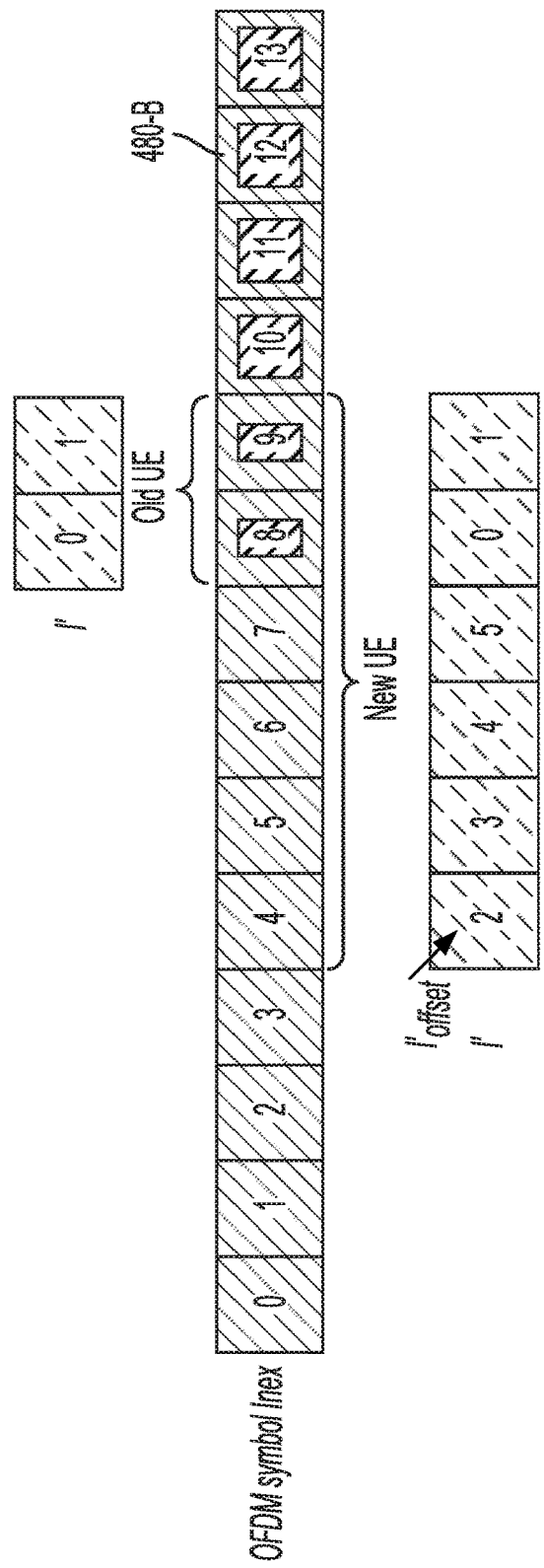

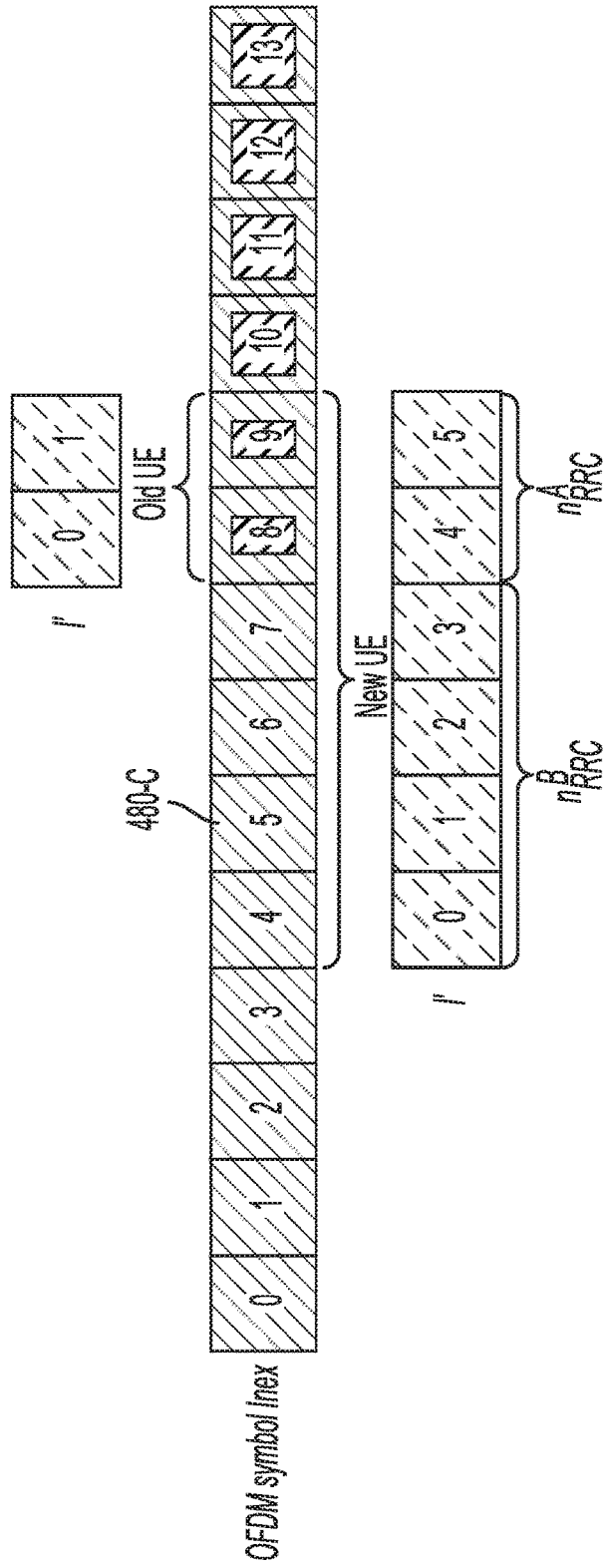
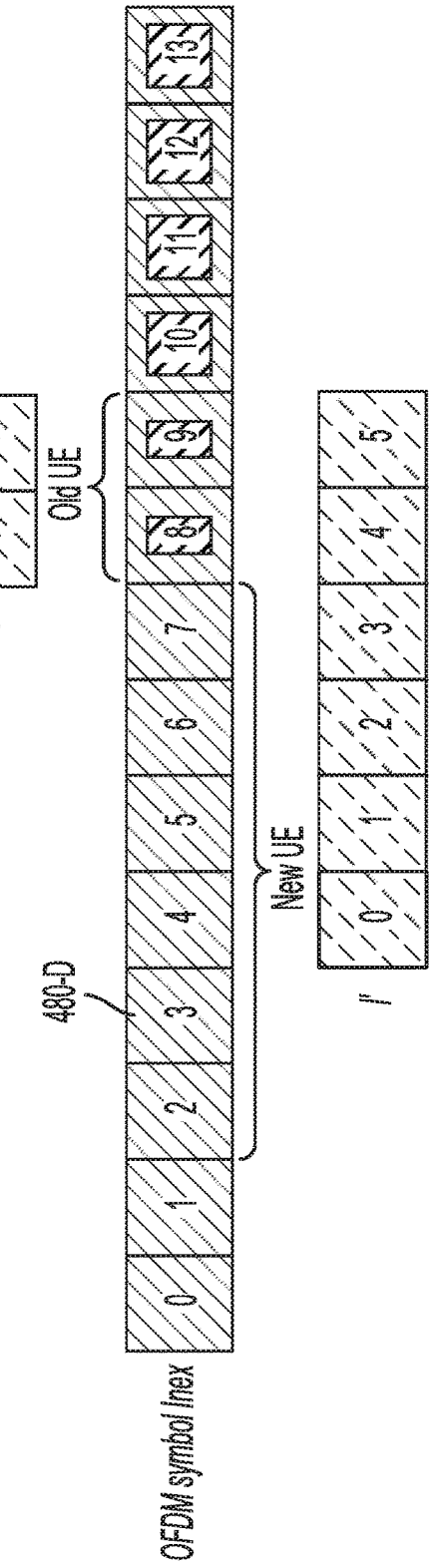
FIG. 4C
FIG. 4D

SOUNDING REFERENCE SIGNAL
COMPATIBILITY

CLAIM OF PRIORITY UNDER 35 U.S.C. § 119

This application claims priority to provisional patent application Ser. No. 62/868,469, filed on Jun. 28, 2019, entitled "Sounding Reference Signal Compatibility," which is hereby incorporated by reference in its entirety.

BACKGROUND

The following relates generally to wireless communication, and more specifically to sounding reference signals (SRS).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

Techniques under development provide for new spectrum and new network configurations to improve performance and capability of telecommunications networks. Some new techniques are part of the fifth generation new radio (5G NR) development. 5G is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in 5G technology. Preferably, these improvements should be applicable to other multi-access technologies and the telecommunication standards that employ these technologies.

SUMMARY

Methods, devices, systems, and computer readable storage media for wireless communication are described. Different user equipments may use different SRS techniques, depending on their capabilities and/or support for particular standards. In particular, some user equipments transmit SRS only in a first SRS region (such as an existing SRS region described below), while others transmit SRS in the first SRS region and another second SRS region (such as an added SRS region described below). Techniques provided herein allow for compatible SRS transmissions using either or both SRS regions, depending on capabilities and use cases.

In general, in an aspect, a method of wireless communication performed by a user equipment (UE) provides techniques for frequency domain subband hopping in sounding reference signal (SRS) transmissions. For a first slot in which at least one different user equipment uses a first symbol counter to determine a subband for one or more SRS resources included in an existing SRS region of the first slot, the UE uses a second different symbol counter for an SRS resource including at least one symbol in an added SRS region and at least one symbol in the existing SRS region. The second symbol counter and the first symbol counter have a same value for the symbols of the existing SRS region. In some aspects, the second different symbol counter is shifted by a symbol counter offset amount from the first symbol counter.

In some implementations, the method further comprises receiving configuration information for the SRS resource, and the first symbol counter is a parameter l' and the second different symbol counter is a sum of the parameter l' and a parameter l' offset, and where l' offset is received in the configuration information. In some implementations, the parameter l' offset is configured in a Radio Resource Control (RRC) configuration of the SRS resource. In some implementations, the second different symbol counter uses a round robin scheme with a maximum symbol counter value, wherein according to the round robin scheme a next symbol after a symbol having the maximum symbol counter value has a symbol counter value of zero. For some SRS resources, for at least one symbol of a slot, the sum of l' and $l'_{offset}$ is greater than two. The method may further include transmitting an SRS signal of the SRS resource in a first symbol using a first subband and subsequently transmitting an SRS signal of the SRS resource in a second symbol using a second subband, wherein the second subband is determined using frequency domain subband hopping using the second different symbol counter.

In general, in another aspect, a method of wireless communication performed by a user equipment (UE) provides another technique for frequency domain subband hopping in sounding reference signal (SRS) transmissions. In one aspect, for an SRS transmission including one or more symbols in an existing SRS region and one or more symbols in an added SRS region of a slot, a first subband hop shift is applied for the one or more symbols of the existing SRS region and a second different subband hop shift is applied for the one or more symbols of the added SRS region. The first subband hop shift can be a radio resource control (RRC) configured parameter $n_{RRC}^A$, and the second subband hop shift can be an RRC configured parameter $n_{RRC}^B$. The method may further comprise using a symbol counter l' and the parameter $n_{RRC}^A$ in the one or more symbols of the existing SRS region, and using the same symbol counter l' and the parameter $n_{RRC}^B$ in the one or more symbols of the added SRS region.

In general, in another aspect, a method of wireless communication performed by a user equipment (UE) provides techniques for scrambling sequence identifiers (IDs) for sounding reference signal (SRS) transmissions. In some implementations, a scrambling sequence identifier (ID) of greater than ten bits is used for at least SRS transmissions in an added SRS region of a slot. For SRS transmissions in an existing SRS region of a slot, a scrambling sequence ID of either ten bits or greater than ten bits can be used.

In some implementations, when a scrambling sequence ID of greater than ten bits is used for SRS transmissions in the existing SRS region of the slot, non-zero values can be included for only ten bits of the scrambling sequence ID. For example, when communications between the UE and a base station are code-division-multiplexed (CDM) with communications of at least one UE that only transmits SRS in an existing SRS region, the UE may use non-zero values for only ten bits of the scrambling sequence ID. In some implementations, the scrambling sequence ID of greater than ten bits is a scrambling sequence ID of 12 or 16 bits.

Different use cases may correspond to different uses of the SRS regions. In an example, a positioning use case uses an SRS for positioning that can use the existing SRS region, the added SRS region, or both, while other use cases use only the existing SRS region. Accordingly, the method may comprise receiving configuration information from a base station for SRS resources for the SRS transmissions for a plurality of slots, wherein the configuration information indicates resources in the existing SRS region of the slots or the added SRS region of the slots or both for SRS transmissions for positioning, and only resources in the existing SRS region of the slots for other SRS transmissions, and transmitting the SRS transmissions according to the configuration information. The existing SRS region of a slot may include six symbols and the added SRS region of a slot can include eight symbols.

The UE may receive configuration information for SRS resources for transmitting SRS transmissions for positioning in an existing SRS region of a slot, an added SRS region of the slot or both, and for transmitting other SRS transmissions in only an existing SRS region of the same slot and/or a different slot. In some implementations, the SRS transmissions for positioning in the existing SRS region of the slot and/or the added SRS region of the slot use a scrambling sequence ID of sixteen bits and the other SRS transmissions in the existing SRS region of the same/different slot use a scrambling sequence ID of ten bits. The resources for transmitting SRS transmissions for positioning include at least one symbol in the existing SRS region of the slot and at least one symbol in the added SRS region of the slot. As noted below, different aspects of SRS techniques can be used together. For example, the above implementations regarding a scrambling sequence ID can be used with other implementations described herein. For example, in some examples the SRS transmissions for positioning are not configured for frequency domain subband hopping, while some other SRS transmissions may use frequency domain subband hopping.

In general, in another aspect, a method of wireless communication performed by a user equipment (UE) provides techniques for using different comb types for sounding reference signal (SRS) transmissions. In some implementations, a UE can use a comb type of greater than four for SRS transmissions in an added SRS region of a slot, and can use a comb type of less than or equal to four for SRS transmissions in an existing SRS region of a slot. In some implementations, a UE uses a comb type of two or four for SRS transmissions in the existing SRS region when communications between the UE and a base station are code-division-multiplexed (CDM) with communications of at least one UE that transmits SRS only in an existing SRS region. In some implementations, the comb type of greater than four can be a comb type of six or a comb type of eight.

In some implementations, the SRS transmissions for positioning in the added SRS region of the slot use a comb type of 2, 4, or 8 and wherein the other SRS transmissions in the existing SRS region of the same slot or a different slot use a comb type of 2 or 4. The resources for transmitting SRS transmissions for positioning include at least one symbol in the existing SRS region of the slot and at least one symbol in the added SRS region of the slot. As noted below, different aspects of SRS techniques can be used together. For example, the above implementations regarding comb types can be used with other implementations described herein. For example, in some examples the SRS transmissions for positioning are not configured for frequency domain subband hopping, while some other SRS transmissions may use frequency domain subband hopping.

In general, in another aspect, a method of wireless communication performed by a user equipment (UE) provides techniques for group or sequence hopping in sounding reference signal (SRS) transmissions. In some implementations, for an SRS transmission of SRS resources in only an existing SRS region of a first slot, the UE uses group hopping or sequence hopping but not both in the SRS transmission. For an SRS transmission of SRS resources in only in an added SRS region of the first slot, the UE uses group hopping, sequence hopping or both in the SRS transmission. For transmission of an SRS resource in the first slot with at least one symbol in the added SRS region and at least one symbol in the existing SRS region, the UE can use no group or sequence hopping, group hopping, or sequence hopping, but not both group and sequence hopping. In another aspect, in at least one other slot, the UE can transmit at least one SRS resource in the existing SRS region or the added SRS region or both, wherein the at least one SRS resource uses no group or sequence hopping. In some implementations, a sequence group number u indicates a sequence group and a base sequence number v indicates a base sequence number within a group, and wherein u and v are varied over symbols of an SRS resource in the added SRS region to use both group hopping and sequence hopping.

In general, in another aspect, a method of wireless communication performed by a user equipment (UE) provides techniques for transmitting sounding reference signals for a plurality of SRS resources of an SRS resource set. In some implementations, the UE uses a first set of open loop power control parameters to transmit at least one SRS resource of the SRS resource set in an added SRS region of a slot and using a second different set of open loop power control parameters to transmit at least one SRS resource of the SRS resource set in an existing SRS region of the slot. The first set of open loop power control parameters and the second different set of open loop power control parameters can include at least one power control parameter that is the same, or they may all be different. The open loop power control parameters can include an alpha value, a p0 value, and a pathloss reference parameter.

In some implementations, if the SRS resource set includes a SRS resource with at least one symbol in the existing SRS region and at least one symbol in the added SRS region, the UE uses the same set of open loop power control parameters to transmit the at least one symbol in the existing SRS region and the at least one symbol in the added SRS region. The same set can be the first set or the second set. In some implementations, the SRS resource set can be associated with at least one use case selected from the group consisting of an uplink codebook use case, an uplink non-codebook use case, an antenna switching use case, a beam management use case, a positioning use case, a cross link interference use case, and a remote interference management use case. If the use case can use the added SRS region, an SRS resource set for a different use case that only uses the existing SRS region can be transmitted in a different slot. A use case that can use the added SRS region may be a use case selected from the group consisting of an uplink codebook use case, an uplink non-codebook use case, an antenna switching use case, a beam management use case, and a positioning use case. The use case that uses the existing SRS region only can be selected from the group consisting of a cross link interference use case and a remote interference management use case.

Note that herein designation of a "first" slot or a "first" or "second" subband or other claim feature does not imply that the feature precedes or follows any other feature in time or frequency, but instead is used to designate a particular slot, subband, or the like.

In general, in another aspect, a user equipment may include memory and a process, where the processor is in communication with the memory and the processor and memory are configured to perform the actions discussed above. The memory need not be in a discrete or single memory circuit or chip, and in some embodiments at least some memory can be on-board memory for one or more processor circuits of the processor. The processor need not be a single processor circuit but may include some portions of different processor circuits. The memory and processor are in communication, where the phrase "in communication" is used to refer to electrical connection either with or without intervening elements and does not require the user equipment or other apparatus to be operating. In operation, the processor accesses instructions and data from the memory and executes instructions to perform operations. The user equipment also includes a transceiver in communication with the processor and memory, where the transceiver can include receive circuitry to receive signals from network apparatus such as a gNodeB and can include transmit circuitry to transmit signals to the network apparatus. In general, in another aspect, a computer readable storage medium includes instructions to perform the operations of the methods disclosed above.

BRIEF DESCRIPTION OF THE DRAWINGS

FIG. 4A illustrates an example slot where a symbol counter 1' starts at zero for a UE transmitting SRS only in an existing SRS region and for a UE transmitting SRS resources that extend from an added SRS region to an existing SRS region;

FIG. 4B illustrates an example slot where a symbol counter for the added SRS region can be modified by an offset amount at least when the SRS resources extend from the added SRS region into the existing SRS region;

FIG. 4C illustrates an example slot where the same symbol counter but different frequency domain shift position values are used in the added SRS region and the existing SRS region;

FIG. 4D illustrates an example slot where subband hopping is not enabled for SRS resources that extend from the added SRS region to the existing SRS region, so if subband hopping is enabled SRS resources in one region or the other but not both are used;

DETAILED DESCRIPTION

One important aspect of reliable wireless communication is acquiring information about communication channels. A sounding reference signal (SRS) is a reference signal transmitted by a UE on the uplink. The SRS may be used by the base station (e.g., gNB or eNB) to estimate the uplink channel quality.

In legacy Long Term Evolution (LTE), SRS can only be transmitted in the last symbol of a subframe. More recent work items for LTE Multi-Input-Multi-Output (MIMO) standardization include support of SRS capacity/coverage enhancements, by introducing more than one symbol for SRS on UL normal subframe, as well as virtual cell ID for SRS. In LTE, an SRS symbol in the last symbol of a slot is referred to as a "legacy" SRS symbol, while SRS symbols in the preceding five symbols are referred to as "additional" SRS symbols. In LTE Release 15, SRS can be transmitted in the last six symbols of a slot, and can only be transmitted in a particular slot after the Physical Uplink Shared Channel (PUSCH) in that slot.

For LTE, both a legacy SRS symbol and additional SRS symbol(s) can be configured for the same UE. For aperiodic SRS transmissions, currently the UE can transmit one of legacy SRS symbol(s) or additional SRS symbol(s) in the same subframe, with the possibility of transmitting both legacy SRS symbols and additional SRS symbol(s) in the same subframe. For the periodic SRS case, the UE can transmit legacy SRS (last symbol) and additional SRS symbol(s) in the same or different subframes.

Figure 1:
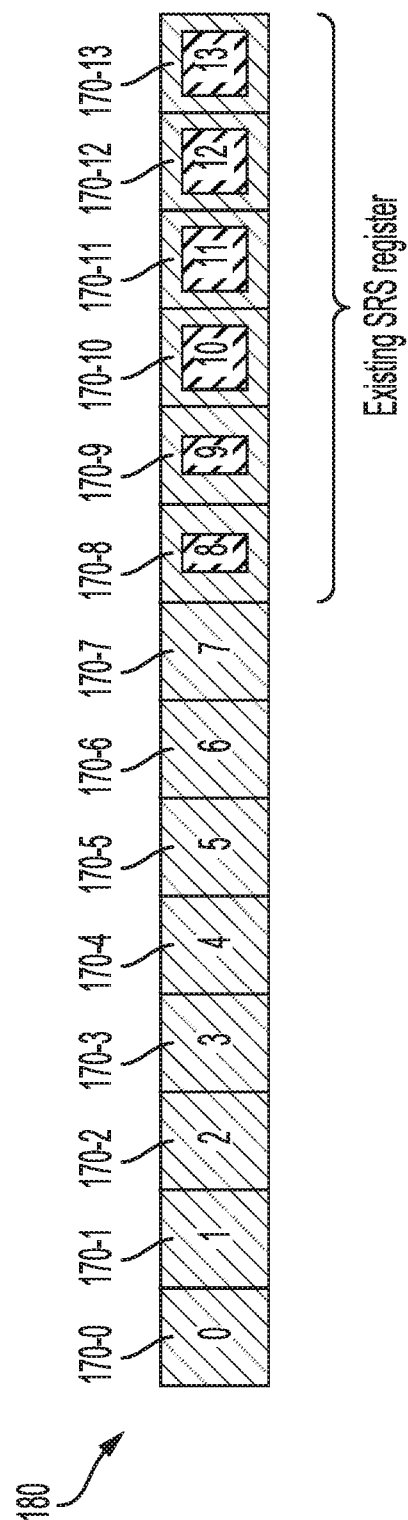
FIG. 1 illustrates an example fourteen symbol slot with a six symbol existing SRS region, according to the prior art.

FIG. 1 illustrates the fourteen symbols 170-0 to 170-13 of a NR Release 15 slot 180, according to the prior art. Release 15 supports SRS resources that span 1, 2, or 4 adjacent symbols with up to four ports per SRS resource. All ports of an SRS resource are sounded in each included symbol. In release 15, SRS can only be transmitted in the last six symbols 170-8 to 170-13 of slot 180. Further, for slots that include Physical Uplink Shared Channel (PUSCH) resources, an SRS can only be transmitted after PUSCH in that slot.

An SRS resource set contains a sets of SRS resources for one UE. An SRS resource set may be transmitted aperiodically (DCI-signaled), semi-persistently, or periodically. SRS transmission may be wideband/subband, with a bandwidth that is a multiple of four physical resource blocks (PRBs).

Figure 2:
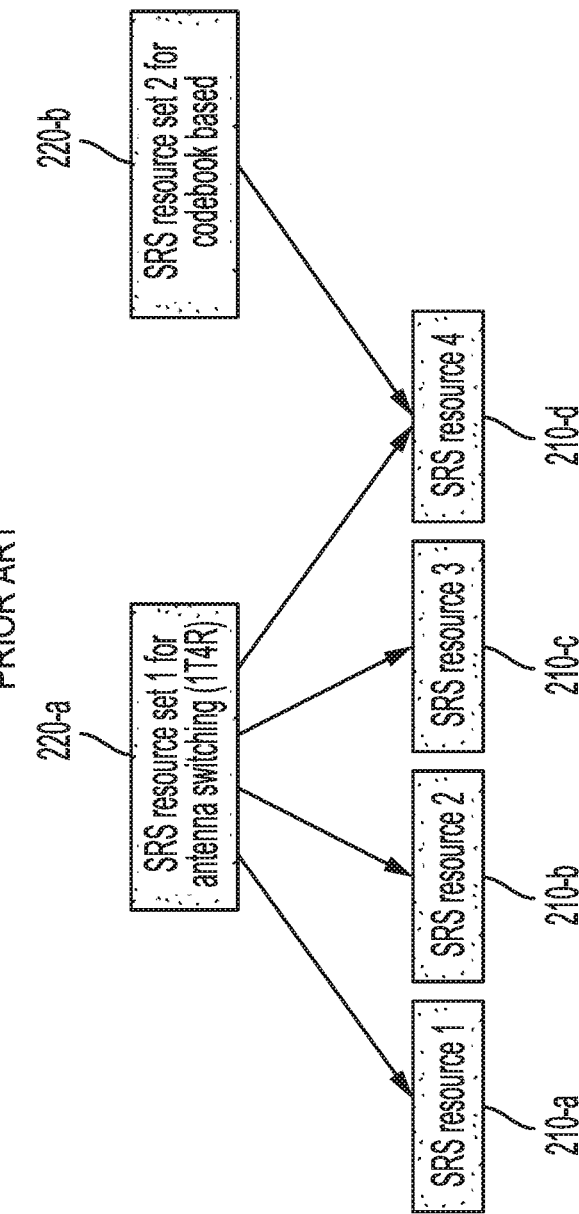
FIG. 2 illustrates example SRS resource sets, according to the prior art.

A UE may be configured with multiple SRS resources, which may be grouped in an SRS resource set depending on the use case (antenna switching, codebook-based, non-codebook based, beam management, etc.). FIG. 2 shows one implementation of SRS resource sets for different applications. In FIG. 2, a UE may be configured with four SRS resources 210-a to 210-d. FIG. 2 illustrates two resource sets 220-a and 220-b that include some shared SRS resources. Resource set 220-a is an antenna switching resource set referred to as 1T4R and associated with all four SRS resources 210-a to 210-d. Resource set 220-b is a codebook-based resource set and is associated with (shared) SRS resource 210-d. In the example of 1T4R in FIG. 2, each SRS resource 210-a to 210-d is associated with a single symbol, with a symbol gap between each SRS resource to allow for antenna switching. In current techniques, resource set 220-a cannot be accommodated in a single slot 180, since it uses seven symbols in total (four SRS transmission symbols with one symbol gap in between transmissions). As noted above, some SRS resources (and resource sets containing the SRS resources) may occupy more than one symbol; for example, an SRS resource may have two or four adjacent symbols.

The examples described herein provide techniques to use symbols other than an existing SRS region to transmit SRS. Herein, the phrase "existing SRS region" refers to symbols on which a UE can currently transmit SRS (based on allowed SRS resources for a particular Radio Access Technology (RAT) used by the UE or based on the particular UE capability for SRS resources). For example, the existing SRS region for a UE using SRS resources according to LTE Rel. 15 is included in the last six symbols of a slot as long as the UE is capable of transmitting SRS in those symbols, while the existing SRS region for a UE using SRS resources according to LTE Rel 14 is the last symbol of the slot. The phrase "added SRS region" refers to one or more symbols of a slot where SRS symbols can be configured that does not overlap the existing SRS region and can be used by a UE from a later release of the same RAT, or from a UE capable of transmitting in both the existing and the added SRS region. In some cases, an SRS resource can include a plurality of symbols that extend into the existing SRS region from the added SRS region.

One challenge that can arise when incorporating new SRS techniques is that UEs that use older SRS techniques will be deployed and communicating with the network along with the UEs that use newer SRS techniques. The current disclosure describes techniques for backward compatibility of UEs that can use the added SRS region with UEs that use only the existing SRS region. For example, the current disclosure includes techniques that can be used so that orthogonality between transmissions of these different populations of UEs is preserved.

One example of a compatibility issue is the implementation of subband hopping for SRS transmission. Subband hopping is a technique that is used to obtain orthogonality between subband transmissions of UEs on the same OFDM symbols. In current techniques, a number of parameters are defined to enable effective subband hopping, maintaining orthogonality among SRS transmissions of UEs transmitting SRS on the same symbols.

SRS subband hopping on a predetermined sequence uses the following (higher layer configured) parameters for current techniques:

$n_{RRC}$ is the frequency domain shift position, configured by Radio Resource Control (RRC)

$m_{SRS,b}$ is the size of each subband to be hopped $N_b$ is the number of subbands to be hopped $n_{SRS}$ is an SRS counter that is used to is as an input in the function $F_b(n_{SRS})$ which provides orthogonality between subband transmissions of UEs on the same OFDM symbols. SRS counter $n_{SRS}$ is determined as follows for aperiodic SRS resources and for periodic SRS resources.

For an aperiodic SRS resource:

$$n_{SRS} = \lfloor P/R \rfloor$$

While for a periodic SRS resource:

$$n_{SRS} = \left( \frac{N_{slot}^{frame,\mu} n_f + n_{s,f}^{\mu} - T_{offset}}{T_{SRS}} \right) \cdot \left( \frac{N_{symb}^{SRS}}{R} \right) + \left\lfloor \frac{l'}{R} \right\rfloor$$

$T_{SRS}$ and $T_{offset}$ are the periodicity and offset within a frame $N_{symb}^{SRS}$ is the number of symbols per SRS resource R is the number of repetitions inside the SRS resource $l' \in \{0, 1, \ldots, N_{symb}^{SRS}-1\}$ is the counter of the SRS symbol $$F_b(n_{SRS}) = \begin{cases} (N_b/2) \left\lfloor \frac{n_{SRS} \mod \prod_{b'=b_{hop}}^{b} N_{b'}}{\prod_{b'=b_{hop}}^{b-1} N_{b'}} \right\rfloor + \left\lfloor \frac{n_{SRS} \mod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases}$$

The parameter $n_b$ is the subband index that controls the subband hop of each SRS occasion (1') and it is a function of the RRC-configured parameter $n_{RRC}$ and the non-linear function $F_b(n_{SRS})$:

$$n_b = \begin{cases} \lfloor 4n_{RRC}/m_{SRS,b} \rfloor \mod N_b & b \leq b_{hop} \\ \{F_b(n_{SRS}) + \lfloor 4n_{RRC}/m_{SRS,b} \rfloor\} \mod N_b & \text{otherwise} \end{cases}$$

Figure 3:
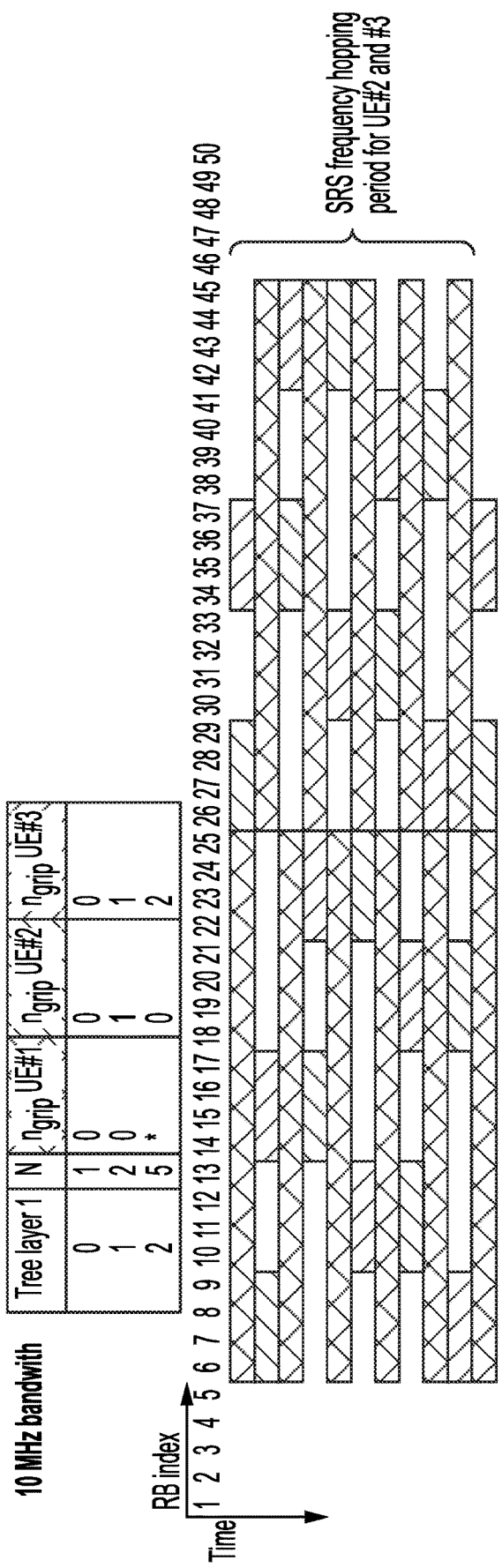
FIG. 3 illustrates an example resource grid for SRS subband hopping, according to the prior art.

FIG. 3 shows an example resource grid for three UEs: $UE_1$, $UE_2$, and $UE_3$. In FIG. 3, $UE_2$ and $UE_3$ are transmitting SRS using subband hopping to maintain orthogonality while transmitting on the same symbols. The horizontal direction shows resource block (RB) indices (where each transmission corresponds to four RBs), and where the vertical direction shows time (in symbols). In the first symbol illustrated in FIG. 3, $UE_2$ transmits SRS using RBs 26-29 and $UE_3$ transmits SRS using RBs 34-37. After a first subband hop, $UE_2$ transmits on RBs 6-9, while $UE_3$ transmits on RBs 14-17, and so on for subsequent symbols. In the example of FIG. 3, the repetition parameter R is one, so the subband hopping occurs every symbol. For R=2, the same subband is used for two consecutive symbols, and so on. As FIG. 3 shows, current subband hopping techniques allow for multiple UEs to transmit SRS on the same symbols without colliding.

As noted above, the counter $n_{SRS}$ is the operand for the function $F_b$, and determines how the subband hops are performed from one symbol to the next for a particular UE. For an aperiodic SRS resource, the SRS counter is a local counter triggered by Downlink Control Information (DCI). For aperiodic SRS resources, $n_{SRS}$ has a value of 1'/R, where 1' is the symbol counter of the SRS symbol and R is the number of repetitions inside the SRS resource. Since aperiodic SRS starts with an SRS counter value of 1'=0 each time it is triggered, not all subbands may be sampled when subband hopping is used for aperiodic SRS. By contrast, periodic SRS is configured by the network. For periodic SRS, symbol counter 1' does not reset to zero, so over time periodic SRS will sample all of the available subbands.

In one aspect, techniques described herein allow efficient transmission in circumstances where UEs using only existing SRS regions for SRS transmissions and UEs configured to use both existing and added SRS regions can be transmitting SRS in circumstances where the transmissions may interfere.

FIG. 4A shows an example first slot 408 where a first $UE_1$ transmits only in the existing SRS region and a second $UE_2$ transmits SRS in both the existing SRS region and the added SRS region. FIG. 4A shows that if the symbol counter 1' starts at zero for both UEs, symbols with symbol indices eight and nine will have different symbol counter values for $UE_1$ and $UE_2$. If $UE_2$ were to only transmit SRS in the added SRS region there would be no collision, but since in this example the SRS resources extend into the previous SRS region it is possible that both $UE_1$ and $UE_2$ would transmit on the same symbol and the same subband.

FIG. 4B illustrates a first option to prevent collisions between different types of UEs transmitting SRS in the same symbols when at least one UE is transmitting using SRS resources with symbols in both the added SRS region and the existing SRS region. $UE_1$ uses a first symbol counter according to the existing definition of 1', so symbols eight and nine in slot 408 correspond to 1' values of zero and one. In the illustrated example, $UE_2$ uses a second different symbol counter, with a symbol counter offset and cycles the counter back to zero after it reaches its maximum value, so for both $UE_1$ and $UE_2$, symbols eight and nine correspond to symbol counter values of zero and one. In the example of FIG. 4B, the parameter $1'_{offset}$ is equal to two, and a round robin scheme is used to cycle the second symbol counter back to zero after the maximum symbol counter value $1'_{max}$ for the SRS resources (five in the illustrated example).

FIG. 4C illustrates a second option to prevent collisions between SRS transmissions between a UE using only the existing SRS region and a UE using both regions with resources extending from the added SRS region to the existing SRS region. In FIG. 4C, the same 1' is used but different frequency domain shift position $n_{RRC}$ values are assigned to the symbols in the added SRS region and in the existing SRS region. Parameter $n_{RRC}^B$ is applied in the added SRS region, while parameter $n_{RRC}^A$ is applied in the existing SRS region.

In a third option illustrated by FIG. 4D, frequency domain subband hopping may be disabled if SRS resources extend from the added SRS region into the existing SRS region (for example, for SRS transmissions for positioning with resources in the existing SRS region, the added SRS region, or both). In cases where frequency domain subband hopping is enabled, $UE_2$ does not transmit SRS in resources that extend from the added SRS region into the existing SRS region. With this technique, orthogonality is maintained since $UE_1$ and $UE_2$ do not transmit SRS on the same symbols.

Additional techniques can be used to provide backward compatibility for UEs using both existing and added SRS regions with UEs using only an existing SRS region. In existing NR Release 15 techniques, a scrambling sequence identifier (ID) of ten bits is configured in each SRS resource. For scrambling sequence IDs that are larger than ten bits (e.g., twelve or sixteen bits), a number of options may be used.

In a first option, a scrambling sequence ID with more than ten bits may only be allowed to be configured for the SRS in the added SRS region, while SRS in the existing SRS region would still use a scrambling sequence ID of ten bits. In a second option, the scrambling sequence ID with more than ten bits can be configured in all SRS resources for UEs that are configured to transmit SRS in both regions, but when such a UE is code-division-multiplexed (CDMd) with a UE that is only configured to transmit SRS in the existing SRS region, only the ten least significant bits (LSB) are configured to a non-zero value, with the remaining bits set to zero (e.g., two bits for a twelve bit scrambling sequence ID or six bits for a sixteen bit scrambling sequence ID).

Another aspect of backward compatibility relates to comb-type. In current techniques using the existing SRS region (e.g., NR Release 15 techniques), a comb-type of two or four can be configured for each SRS resource. In some embodiments, for UEs using both an existing SRS region and an added SRS region, a UE can use comb-types greater than four (such as six, eight, and so on) in at least the added SRS region. In a first option, comb-types greater than four can be allowed only for SRS transmissions in the added SRS region. This option may be particularly beneficial when the new comb-type cannot be frequency division multiplexed (FDMd) orthogonally with NR Release 15 UEs. In a second embodiment, the new comb-type options can be configured in all SRS resources for a UE using both regions, but whenever the UE is CDMd with a UE using only the existing SRS region, the comb-type can be restricted to two and four.

Another way to orthogonalize transmissions from different UEs in the same symbol uses sequence and group hopping techniques. Existing sequence and group hopping techniques are used to orthogonalize transmissions in the spatial domain so that even if the UEs transmit in the same symbol and same RB s, the signals are still orthogonal.

In existing techniques, a reference-signal sequence r(n) is generated according to $r(n)=\bar{r}_{u,v}(n)$, where $n=0, 1, \ldots, M_{ZC}-1$, with $M_{ZC}=N_{SRS}/2^\delta$ is the length of the sequence and $N_{SRS}$ is the number of subcarriers in the SRS allocation. The sequences $\bar{r}_{u,v}(n)$ are divided into 30 groups, where $u=\{0, 1, \ldots, 29\}$ is the sequence group number and v is the base sequence number within the group, such that each group contains one base sequence (v=0) of each with length $M_{ZC}$, when the allocation is up to five PRBs, and two base sequences (v=0, 1) otherwise.

In existing techniques, there are 3 cases: (1) No sequence or group hopping (u, v are not time varying), (2) Sequence hopping without group hopping (v is time varying symbol-by-symbol), and (3) Group hopping without sequence hopping (u is time varying symbol-by-symbol). Currently, both sequence and group hopping cannot be configured.

According to some embodiments, for SRS transmissions in the added SRS region, both sequence and group hopping can be configured; that is, both u and v can be time varying symbol-by-symbol. If an SRS resource extends across both SRS regions, it can use existing techniques (either none is configured, or one of them, but not both).

Power control can pose another compatibility challenge. Since all UEs can transmit SRS in the existing SRS region, while only some UEs can transmit in the added SRS region, there may be more interference in the symbols of the existing SRS region for a given transmission power. Currently, open loop power control parameters alpha, p0, and pathloss reference (pathlossreferenceRS) are provided for each SRS resource set, where all SRS resources for a resource set are in the last six symbols of one or more slots.

Figure 5:
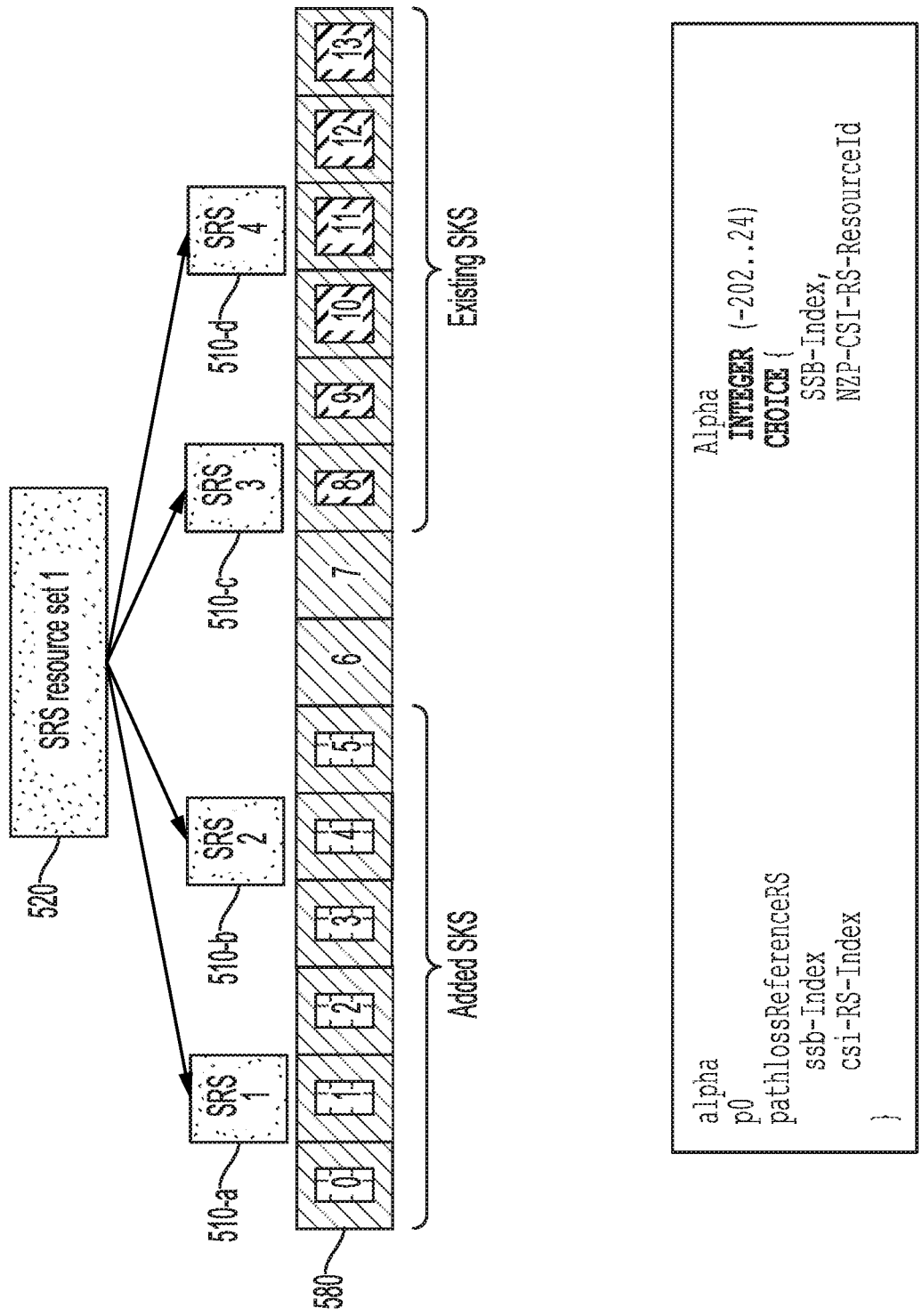
FIG. 5 shows an example of a first slot that illustrates different techniques for providing open loop power control.

FIG. 5 shows an example of a first slot 508 that illustrates different techniques for providing power control for a UE transmitting SRS resources 510-*a* to 510-*d* in an SRS resource set 520, where SRS resources 510-a and 510-b are in the added SRS region and SRS resources 510-c and 510-d are in the existing SRS region. In a first implementation, a first set of power control parameters is used for resources 510-a and 510-b in the added SRS region and a second different set of power control parameters is used for resources 510-c and 510-d in the existing SRS region. In some cases, the power control parameters in the second different set may all be different than the parameters in the first set, while in some cases at least one of the power control parameters may be the same for both sets.

In another technique, the configuration of the power control parameters could be on the resource level (that is, each resource 510-a to 510-d can have its own set of power control parameters, with at least one resource in the set having at least one different power control parameter than a different resource of the set).

In another technique, an offset value can be configured for the SRS resources in the added SRS region with respect to the power control parameters in the existing SRS region, where the offset value is applied to all resources in the new portion. As with the technique above, an offset value may be used for fewer than all of the power control parameters; for example, p0 may have an offset value in the added SRS region but alpha and pathlossreferenceRS may be the same in both regions.

For the above techniques, if a resource includes at least one symbol from both regions, it uses the same power control parameters for each symbol in the resource (since each SRS resource is for a specific antenna port). For example, a two or four symbol resource that uses one to three symbols in the added SRS region and one to three symbols in the existing SRS region uses the same power control parameters for all symbols in the SRS resource.

The above techniques may be applied with some resource sets, while for others a UE that is configured to transmit SRS in both an added SRS region and an existing SRS region may only use the existing SRS region for some use cases. Examples of use cases are uplink codebook, uplink non-codebook, beam management, and antenna switching, positioning, Cross Link Interference (CLI), and Remote Interference Management (RIM). In an example of this implementation, a UE may only use the existing SRS region for SRS transmissions for some SRS use cases such as CLI or RIM, while for positioning use cases (an SRS for positioning) the UE may use both regions.

Figure 6:
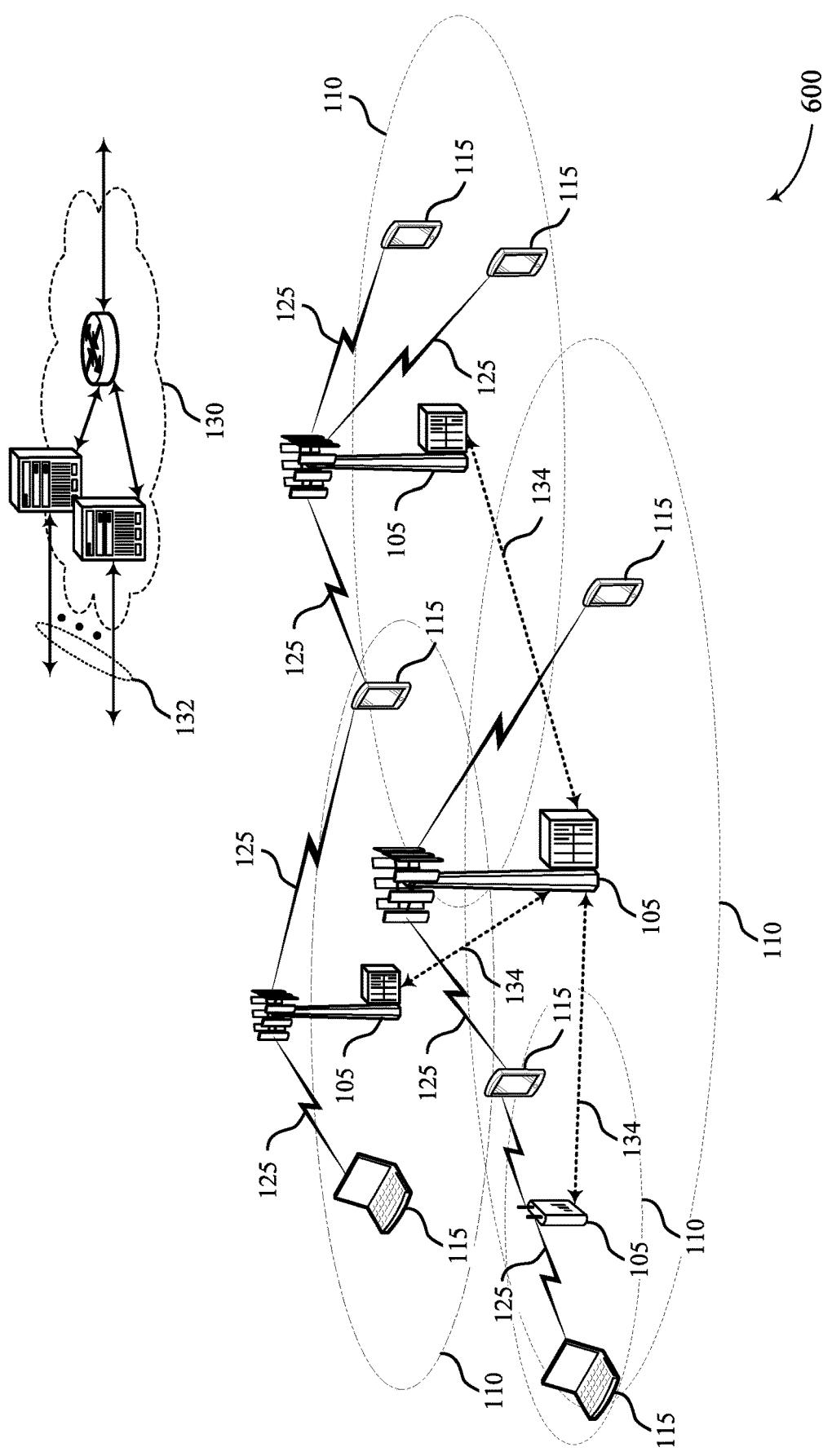
FIG. 6 shows an example wireless communication system.

FIG. 6 illustrates an example of a wireless communications system 600 that supports aspects of the present disclosure. The wireless communications system 600 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Network apparatus such as base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of network apparatus such as base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

Figure 7:
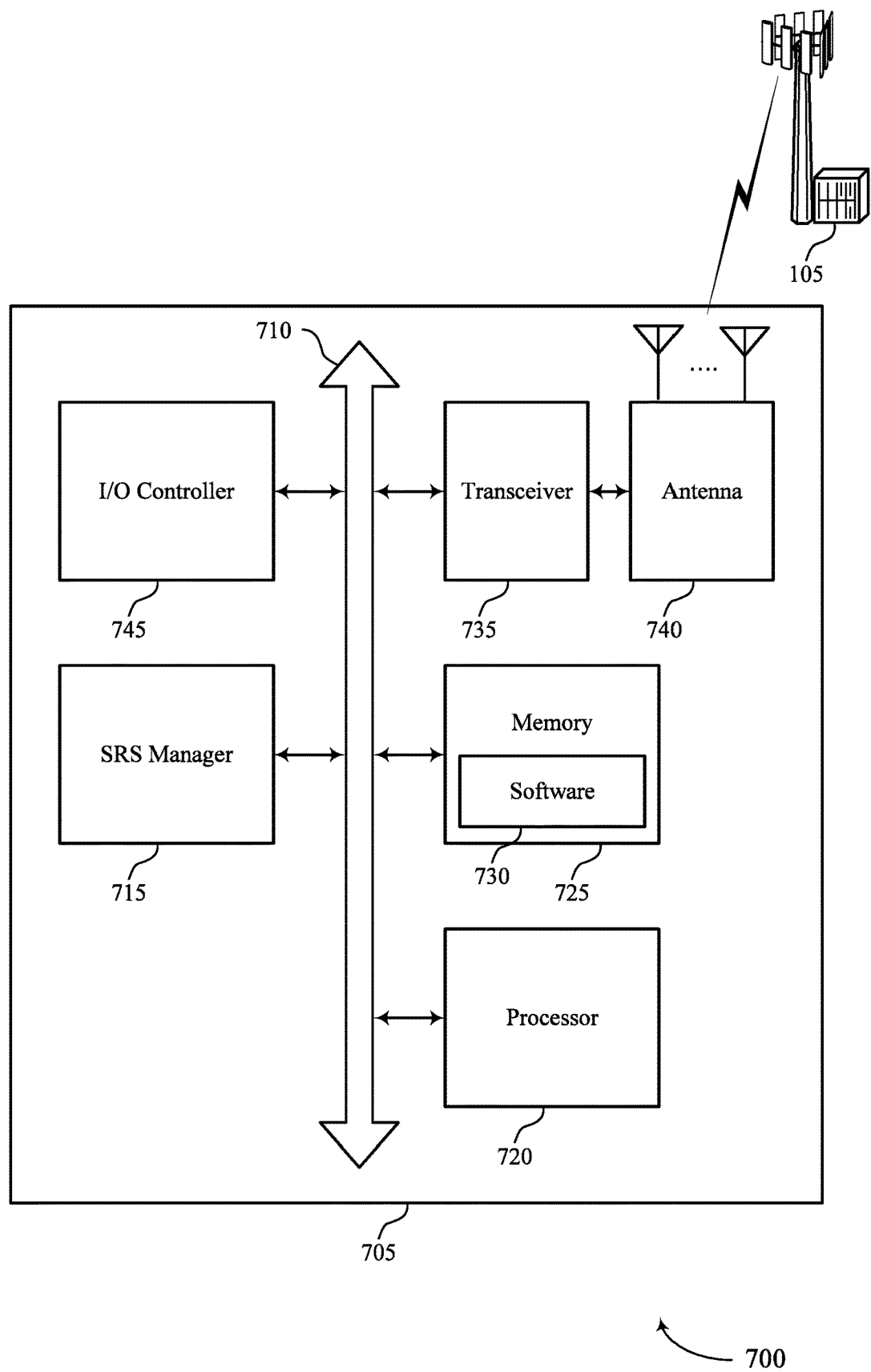
FIG. 7 illustrates an example user equipment.

FIG. 7 shows a diagram of a UE 115 in communication with a base station 105. UE 115 may include components for bi-directional voice and data communications including components for transmitting and receiving communications, including UE communication engine 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting different diversity procedures).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support different diversity configurations. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
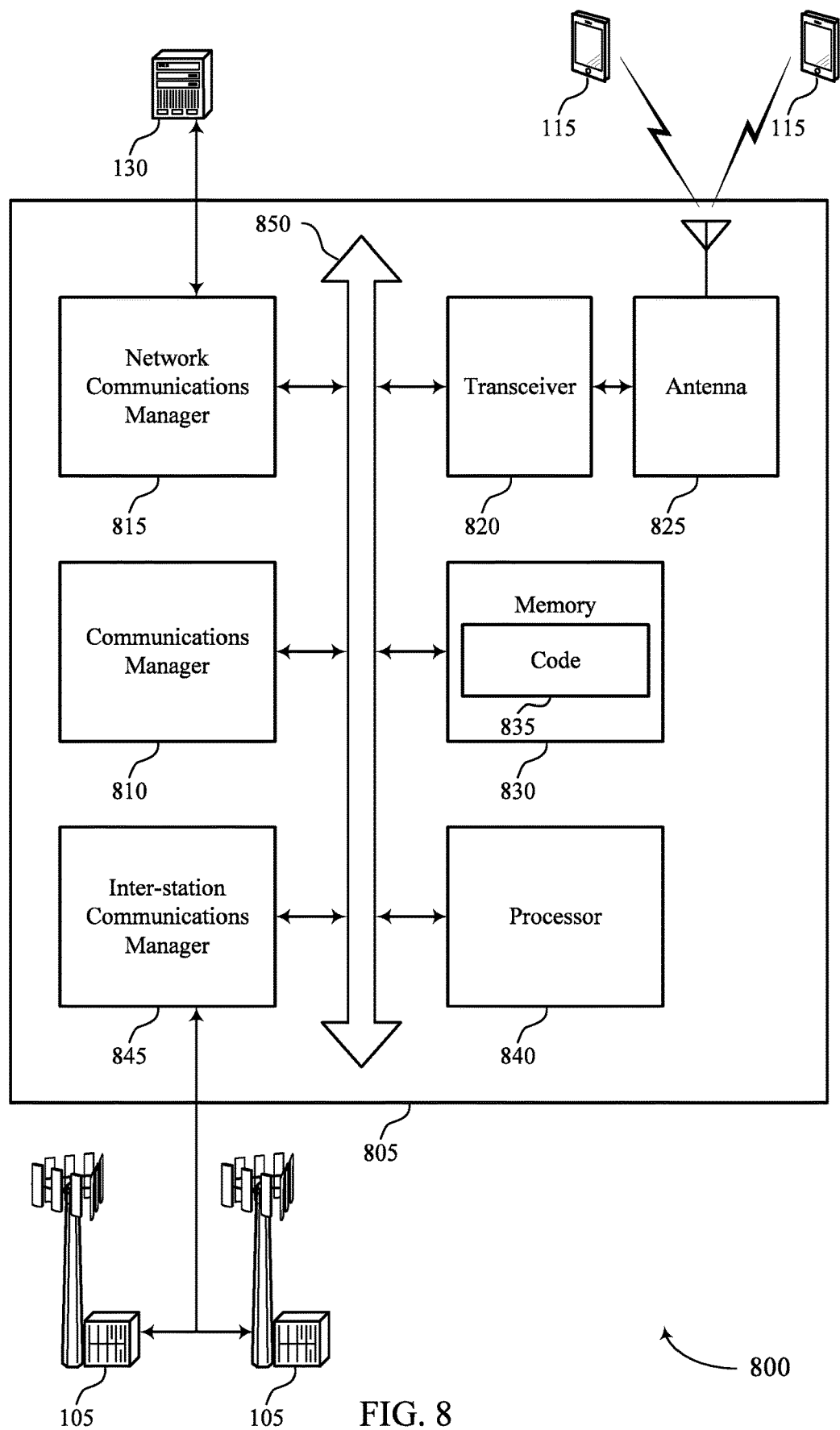
FIG. 8 illustrates an example base station.

FIG. 8 shows a diagram of a system 800 including a network apparatus 805 that supports SRS in at least an added SRS region of one or more slots, in accordance with aspects of the present disclosure. Network apparatus 805 may be a base transceiver station, a radio base station, an access point (AP), a radio transceiver, a NodeB, eNodeB (eNB), Home NodeB, a Home eNodeB, gNodeB, or some other suitable terminology as described herein. The device 805 may include components for bi-directional voice and data communications including components for transmitting and receiving communications, including a communications manager 810, a network communications manager 815, a transceiver 820, an antenna 825, memory 830, a processor 840, and an inter-station communications manager 845. These components may be in electronic communication via one or more buses (e.g., bus 850).

The communications manager 810 may transmit SRS configuration information to one or more UEs 115. The network communications manager 815 may manage communications with the core network (e.g., via one or more wired backhaul links). For example, the network communications manager 815 may manage the transfer of data communications for client devices, such as one or more UEs 115. For SRS resources, UE 115 receives communications from a base station such as network apparatus 805, where the communications include information for SRS resources for the first slot and other slots. For example, for periodic resources, the configuration information includes the information to transmit SRS periodically from the user equipment. For aperiodic SRS resources, the configuration information can be information to trigger the aperiodic resources at the user equipment.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM, ROM, or a combination thereof. The memory 830 may store computer-readable code 835 including instructions that, when executed by a processor (e.g., the processor 840) cause the device to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 840 may be configured to operate a memory array using a memory controller. In some cases, a memory controller may be integrated into processor 840. The processor 840 may be configured to execute computer-readable instructions stored in a memory (e.g., the memory 830) to cause the device to perform various functions (e.g., functions or tasks supporting SRS transmissions by one or more UEs in an added SRS region).

The inter-station communications manager 845 may manage communications with other base station 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communication network technology to provide communication between base stations 105.

The code 835 may include instructions to implement aspects of the present disclosure, including instructions to support wireless communications. The code 835 may be stored in a non-transitory computer-readable storage medium such as system memory or other type of memory. In some cases, the code 835 may not be directly executable by the processor 840 but may cause a computer (e.g., when compiled and executed) to perform functions described herein.

Figure 9:
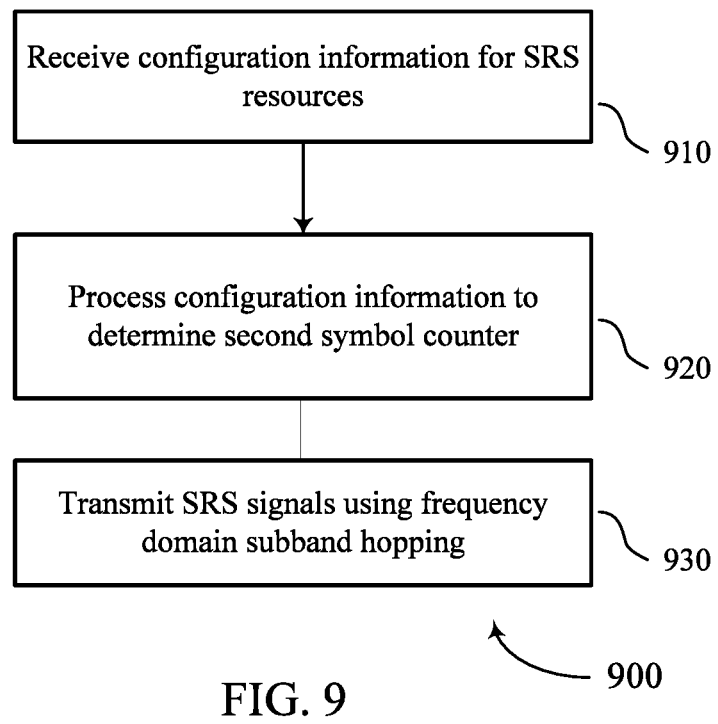
FIG. 9 illustrates an example method for managing frequency domain subband hopping in sounding reference transmissions.

FIG. 9 shows a method 900 to manage frequency domain subband hopping in sounding reference transmissions. Referring to FIGS. 4A to 4D, 5, 6, 7 and 9, at 910, at 910 a UE 115 receives configuration for frequency domain subband hopping. For example, the UE 115 receives Radio Resource Control (RRC) configuration of an SRS resource that includes symbols in an added SRS region and an existing SRS region, where the configuration includes symbol counter information (e.g., 1' and $1'_{offset}$). In an example implementation in which an SRS for positioning can be transmitted in both the existing SRS region and the added SRS region, while other SRS can only be transmitted in the existing SRS region, UE 115 can receive configuration information from a base station 105 for SRS resources for the SRS transmissions for a plurality of slots. The configuration information can indicate resources in the existing SRS region of the slots or the added SRS region of the slots or both for SRS transmissions for positioning, while the configuration information can indicate only resources in the existing SRS region of the slots for other SRS transmissions.

At 920, in a first slot where UEs that only transmit in the existing SRS region use a first symbol counter (e.g., the parameter 1' according to current techniques) for subband hopping, UE 115 processes the configuration information to determine a second different symbol counter to use at the user equipment for the SRS resource that includes at least one symbol in the added SRS region and at least one symbol in the existing SRS resource. For example, the configuration of the SRS resource may include an offset amount $1_{offset}$, and the second symbol counter can be the sum of 1' and $1'_{offset}$, where $1'_{offset}$ is selected so that the second symbol counter and the first symbol counter have the same value for the symbols of the existing SRS region. In some implementations, the second symbol counter can use a round robin scheme with a maximum symbol counter value, where a next symbol after a symbol having the maximum symbol counter value has a symbol counter value of zero. Since the SRS resource that includes symbols in both the added SRS region and the existing SRS region can include multiple symbols in both the existing SRS region and the added SRS region, the offset $1'_{offset}$ can be greater than two. At 930, SRS for the SRS resource can be transmitted using frequency domain subband hopping. For example, in a first symbol of the SRS resource that spans the added SRS region and the existing SRS region, a first subband may be used, and in a later symbol of the SRS resource a second different subband can be used, according to a parameter R (a number of repetitions inside the SRS resource).

Figure 10:
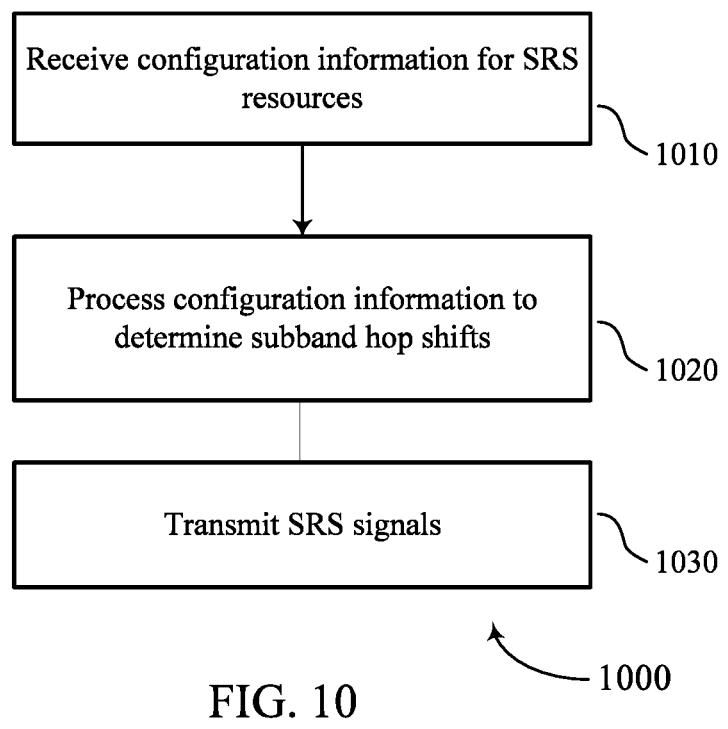
FIG. 10 illustrates an example method to manage frequency domain subband hopping in sounding reference transmissions.

FIG. 10 shows a method 1000 to manage frequency domain subband hopping in sounding reference transmissions. Referring to FIGS. 4A to 4D, 5, 6, 7, and 10, at 1010, a UE 115 receives configuration information for frequency domain subband hopping. In an example implementation in which an SRS for positioning can be transmitted in both the existing SRS region and the added SRS region, while other SRS can only be transmitted in the existing SRS region, UE 115 can receive configuration information from a base station 105 for SRS resources for the SRS transmissions for a plurality of slots. The configuration information can indicate resources in the existing SRS region of the slots or the added SRS region of the slots or both for SRS transmissions for positioning, while the configuration information can indicate only resources in the existing SRS region of the slots for other SRS transmissions.

At 1020, UE 115 can process the configuration information for an SRS resource having at least one symbol in an added SRS region and at least one symbol in an existing SRS region to determine a first subband hop shift to use for symbols of the SRS resource in the existing SRS region and a second subband hop shift to use for symbols of the SRS resource in the added SRS region. In an example, the configuration information may include RRC configured parameters $n_{RRC}^A$ and $n_{RRC}^B$, where the first subband hop shift is indicated by parameter $n_{RRC}^A$ and the second subband hop shift is indicated by parameter $n_{RRC}^B$. In this example, a symbol counter 1' and the parameter $n_{RRC}^A$ are used in the one or more symbols of the existing SRS region, and the same symbol counter 1' and the paramter $n_{RRC}^B$ are used in the one or more symbols of the added SRS region. In another example, frequency domain subband hopping may be disabled if SRS resources extend from the added SRS region into the existing SRS region. For example, frequency domain subband hopping may be disabled for an SRS transmission for positioning that can be configured in the existing SRS region, the added SRS region, or both. At 1030, SRS for the SRS resource can be transmitted using frequency domain subband hopping according to the configured subband hop shifts.

Figure 11:
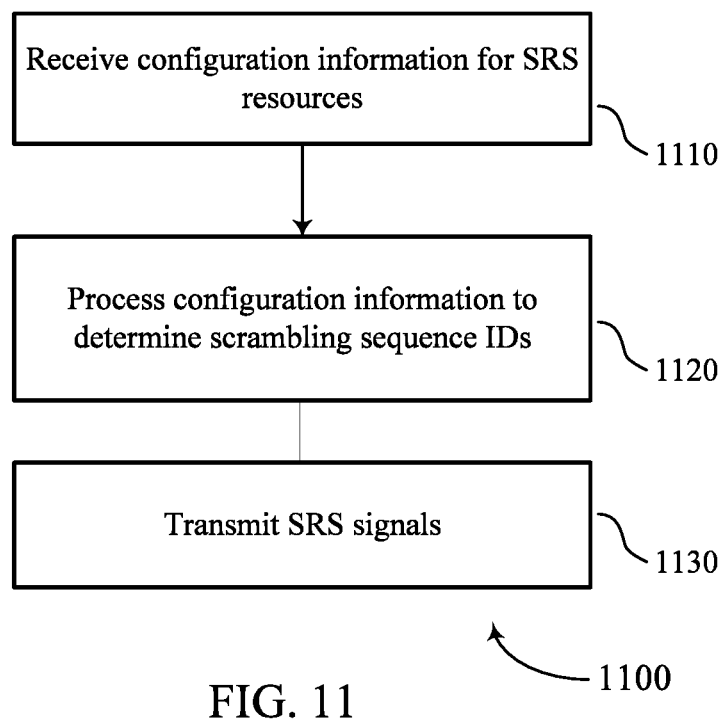
FIG. 11 illustrates an example method to manage SRS transmissions with scrambling sequence identifiers (IDs)
Figure 12:
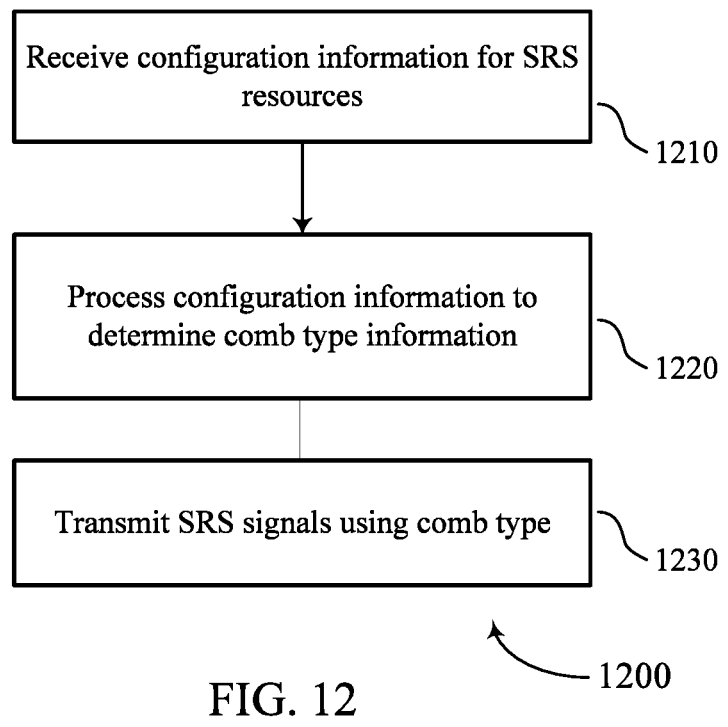
FIG. 12 illustrates an example method to manage SRS transmissions with different comb type options.

FIG. 11 shows a method 1100 to manage SRS transmissions with scrambling sequence identifiers (IDs). Referring to FIGS. 4A to 4D, 5, 6, 7, 9, 10 and 11, at 1110, a UE 115 receives configuration information for scrambling sequence IDs, where UE 115 can be configured for SRS transmissions in an added SRS region and an existing SRS region. In an example implementation in which an SRS for positioning can be transmitted in both the existing SRS region and the added SRS region, while other SRS can only be transmitted in the existing SRS region, UE 115 can receive configuration information from a base station 105 for SRS resources for the SRS transmissions for a plurality of slots. The configuration information can indicate resources in the existing SRS region of the slots or the added SRS region of the slots or both for SRS transmissions for positioning, while the configuration information can indicate only resources in the existing SRS region of the slots for other SRS transmissions.

At 1120, the UE processes the configuration information to determine the scrambling sequence IDs. For SRS transmissions in the added SRS region of the slot, the scrambling sequence ID can be greater than ten bits, while for SRS transmissions in the existing SRS region of the slot, the scrambling sequence ID can be either ten bits or greater than ten bits. For example, the SRS transmissions for positioning in the added SRS region of a slot (and/or in the existing SRS region of a slot) can use a scrambling sequence ID of sixteen bits and the other SRS transmissions in the existing SRS region of a slot can use a scrambling sequence ID of ten bits. If the scrambling sequence ID for transmissions in the existing SRS region of the slot is greater than ten bits, it may include non-zero values for only ten bits when communications between UE 115 and a base station 105 are code-division multiplexed with communications of at least one UE that only transmits SRS in the existing SRS region. At 1130, SRS for the SRS resource can be transmitted using the scrambling sequence IDs.

FIG. 1200 shows a method 1200 to manage SRS transmissions with different comb type options. Referring to FIGS. 4A to 4D, 5, 6, 7 and 9-12, at 1210, a UE 115 receives configuration information for comb types for one or more SRS resources, where UE 115 can be configured for SRS transmissions in an added SRS region and an existing SRS region. In an example implementation in which an SRS for positioning can be transmitted in both the existing SRS region and the added SRS region, while other SRS can only be transmitted in the existing SRS region, UE 115 can receive configuration information from a base station 105 for SRS resources for the SRS transmissions for a plurality of slots. The configuration information can indicate resources in the existing SRS region of the slots or the added SRS region of the slots or both for SRS transmissions for positioning, while the configuration information can indicate only resources in the existing SRS region of the slots for other SRS transmissions.

At 1220, UE 115 processes the configuration information to determine the comb type for SRS transmissions. For SRS transmissions in the added SRS region of the slot, the comb type can be greater than four (e.g., six, eight, etc.), while for SRS transmissions in the existing SRS region of the slot, the comb type can be two or four, or the comb type can be greater than four. For example, the SRS transmissions for positioning in the added SRS region of a slot (and/or in the existing SRS region of a slot) can use a comb type of two, four, or eight and the other SRS transmissions in the existing SRS region of a slot can use a comb type of two or four. If communications between UE 115 and a base station 105 are code-division multiplexed with communications of at least one UE that only transmits SRS in the existing SRS region, the comb type in the existing SRS region is two or four. At 1230, SRS for the SRS resource can be transmitted using the selected comb type.

Figure 13:
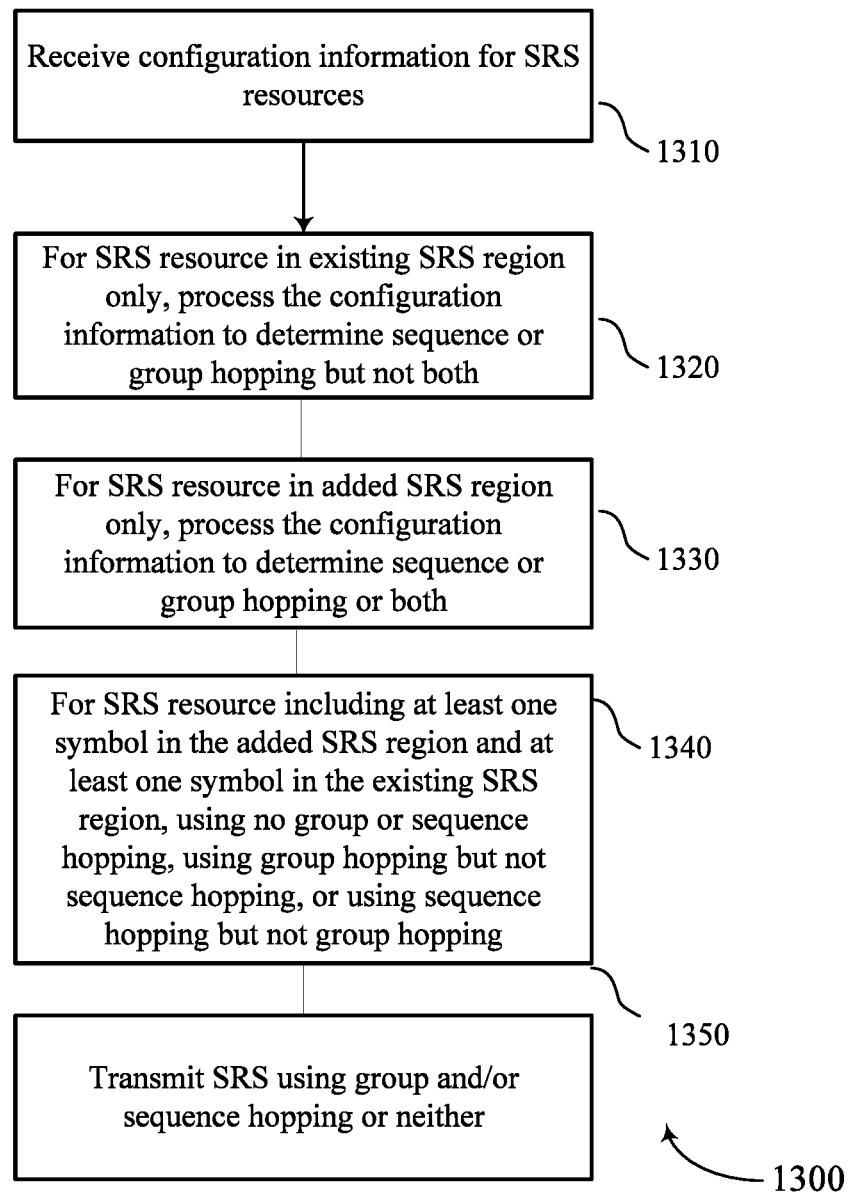
FIG. 13 illustrates an example method to manage sequence and/or group hopping in SRS transmissions.

FIG. 13 shows a method 1300 to manage sequence and/or group hopping in SRS transmissions. Referring to FIGS. 4A to 4D, 5, 6, 7 and 9-13, at 1310, a UE 115 receives configuration information for sequence and/or group hopping. In an example implementation in which an SRS for positioning can be transmitted in both the existing SRS region and the added SRS region, while other SRS can only be transmitted in the existing SRS region, UE 115 can receive configuration information from a base station 105 for SRS resources for the SRS transmissions for a plurality of slots. The configuration information can indicate resources in the existing SRS region of the slots or the added SRS region of the slots or both for SRS transmissions for positioning, while the configuration information can indicate only resources in the existing SRS region of the slots for other SRS transmissions. At 1320, for an SRS resource in only an existing SRS region, UE 115 processes the configuration information to determine sequence or group hopping for the SRS resource but not both, or to determine that no sequence or group hopping is used for the SRS resource. At 1330, for an SRS resource in only an added SRS region, UE 115 processes the configuration information to determine sequence hopping for the SRS resource, group hopping for the SRS resource, or both. For an example where a sequence group number u indicates a sequence group and a base sequence number v indicates a base sequence number within a group, UE 115 can use both group hopping and sequence hopping by varying both u and v over symbols of the SRS resource in the added SRS region. At 1340, for an SRS resource including at least one symbol in the added SRS region and at least one symbol in the existing SRS region, using no group or sequence hopping, using group hopping but not sequence hopping, or using sequence hopping but not group hopping. At 1350, SRS for the SRS resource can be transmitted using the selected sequence and/or group hopping.

Figure 14:
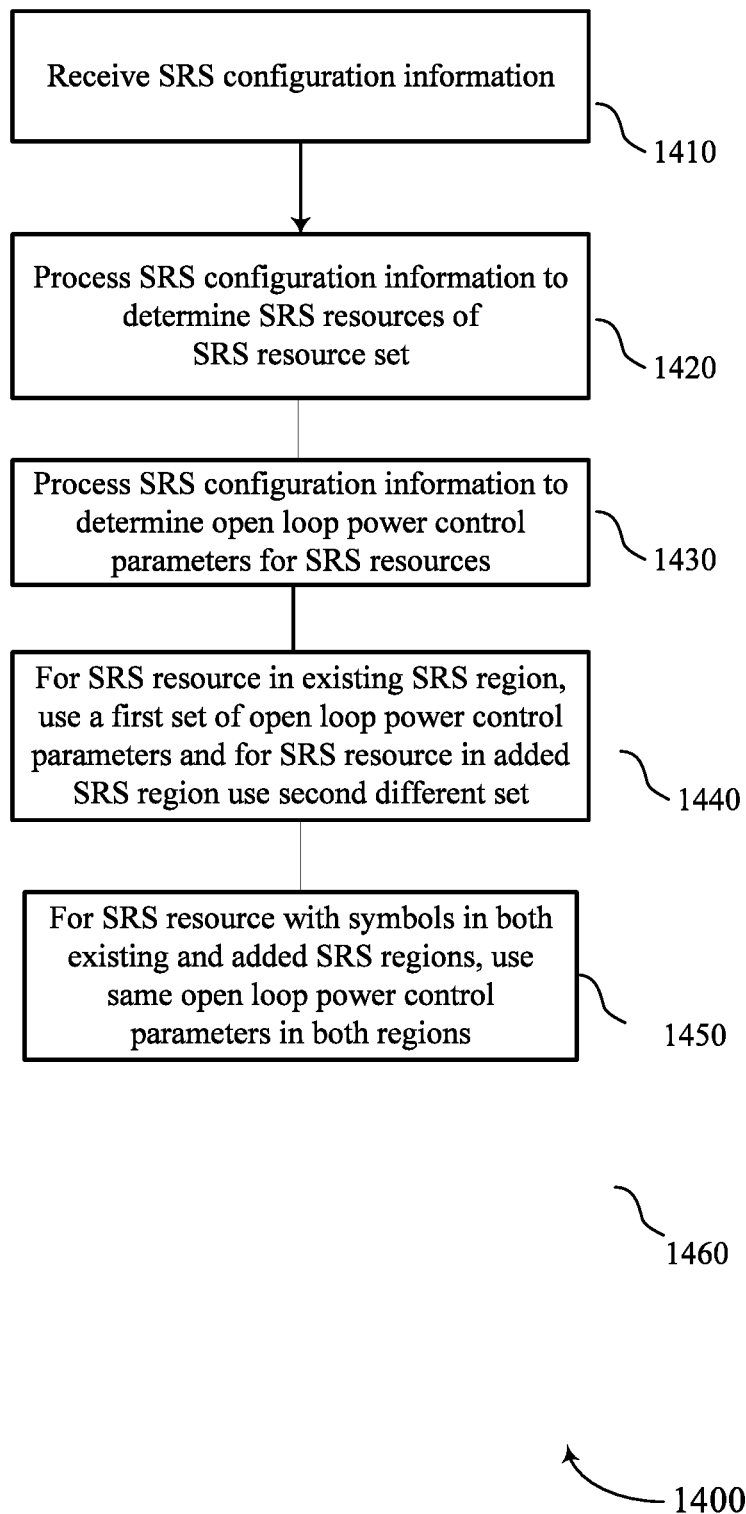
FIG. 14 illustrates an example method to manage open loop power control parameters for SRS resource sets.

FIG. 14 shows a method 1400 to manage open loop power control parameters in SRS transmissions. Referring to FIGS. 4A to 4D, 5, 6, 7 and 9-14, at 1410, a UE 115 receives configuration information for SRS transmissions. In an example implementation in which an SRS for positioning can be transmitted in both the existing SRS region and the added SRS region, while other SRS can only be transmitted in the existing SRS region, UE 115 can receive configuration information from a base station 105 for SRS resources for the SRS transmissions for a plurality of slots. The configuration information can indicate resources in the existing SRS region of the slots or the added SRS region of the slots or both for SRS transmissions for positioning, while the configuration information can indicate only resources in the existing SRS region of the slots for other SRS transmissions. At 1410, UE 115 processes the SRS configuration information to determine SRS resources of an SRS resource set. The configuration information can include open loop power control parameters on the resource level (power control parameters for each SRS resource, including a first set for SRS resources entirely in an existing SRS region, a second set for SRS resources entirely in an added SRS region, and/or a set for SRS resources with at least one symbol in each region). Alternatively, a second set of open loop power control parameters for SRS resources in the added SRS region can be configured using an offset value with respect to one or more parameters in a first set configured for SRS resources in the existing SRS region, where the offset is applied to all SRS resources in the added SRS region.

At 1420, the configuration information is processed to determine SRS resources for an SRS resource set. At 1430, for one or more SRS resources of the SRS resource set in the existing SRS region only, UE 115 processes the configuration information to determine a first set of open loop power control parameters. At 1440, for one or more SRS resources of the SRS resource set in the added SRS region only, UE 115 processes the configuration information to determine a second different set of open loop power control parameters. The open loop power control parameters can include alpha, p0, a pathloss reference parameter, etc. The second different set of open loop power control parameters includes at least one parameter with a different value than its value in the first set of open loop power control parameters. In some implements, all values of the open loop power control parameters are different. At 1450, for one or more SRS resources of the SRS resource set that includes at least one symbol in the existing SRS region and in the added SRS region, the same set of open loop power control parameters are used for all symbols of the SRS resource. These open loop power control techniques may be applied with some resource sets, while for others a UE that is configured to transmit SRS in both an added SRS region and an existing SRS region may only use the existing SRS region for some use cases. Examples of existing use cases are uplink codebook, uplink non-codebook, beam management, and antenna switching, with positioning, Cross Link Interference (CLI), and Remote Interference Management (RIM) discussed as possible additional use cases. In an example of this implementation, a UE may only use the existing SRS region for SRS transmissions for CLI or RIM, while for positioning use cases the UE may use both regions. At 1460, SRS can be transmitted for SRS resources in the SRS resource set.

Figure 15:
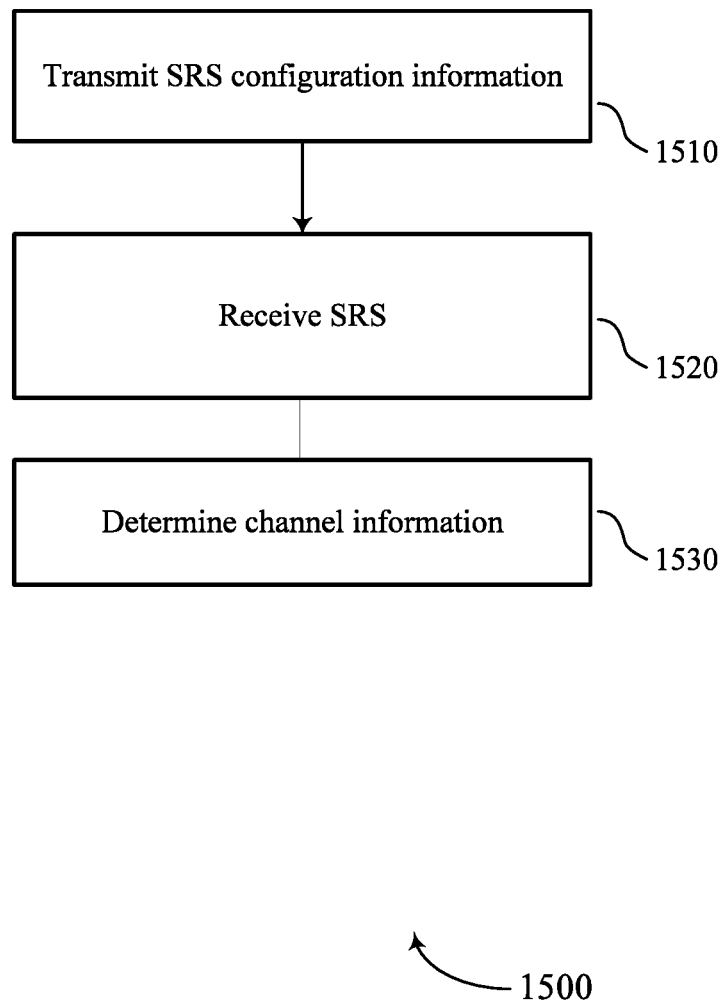
FIG. 15 illustrates an example method for a base station to transmit SRS configuration information to a UE.

FIG. 15 shows a method 1500 for a base station 105 to transmit SRS configuration information to a UE 115. Referring to FIGS. 4A to 4D and 5-15, at 1510, base station 105 transmits configuration information to UE 115, where the configuration information includes at least SRS resource assignment information. The SRS resource assignment information can include configuration for SRS resources as outlined in the examples previously described from the perspective of the UE.

The above techniques may be used together, depending on the implementation. For example, the techniques outlined for compatibility when using frequency domain subband hopping can be used with techniques for scrambling sequence IDs, comb types, sequence/group hopping, and open loop power control be in any combination to provide compatible techniques among UEs using different versions of a RAT, with different capabilities, and in different circumstances.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different (physical) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both computer storage media and communication media including any medium that facilitates transfer of a computer program from one place to another. A computer storage medium may be any available medium that can be accessed by a general purpose or special purpose computer but the phrase "computer storage medium" does not refer to a transitory propagating signal. By way of example, and not limitation, computer storage media can comprise RAM, ROM, electrically erasable programmable read only memory (EEPROM), compact disk (CD) ROM or other optical disk storage, magnetic disk storage or other magnetic storage devices, or other medium that can be used to store desired program code means in the form of instructions or data structures and that can be accessed by a general-purpose or special-purpose computer, or a general-purpose or special-purpose processor. Also, a connection that transmits information is referred to as a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of communication medium.

The techniques herein are described with reference to systems that use wide bands, such as 5G or new radio (NR) systems and future systems that use spectrum in the mmW range of the electromagnetic spectrum. If applicable, techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes a 5G system for purposes of example, and 5G terminology is used in much of the description above, although the techniques are applicable beyond 5G applications.

Base stations may include or may be referred to by those skilled in the art as a base transceiver station, a radio base station, an access point (AP), a radio transceiver, a NodeB, eNodeB (eNB), Home NodeB, a Home eNodeB, gNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 of FIG. 6 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 6) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same or similar reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication performed by a user equipment (UE) for sounding reference signal (SRS) transmissions, the method comprising:
   transmitting SRS transmissions in an added SRS region of a slot using a scrambling sequence identifier (ID) of greater than ten bits; and
   at least one of:
   transmitting the SRS transmissions in an existing SRS region of a slot, using a scrambling sequence ID of ten bits or greater than ten bits, wherein using the scrambling sequence ID of greater than ten bits for the SRS transmissions in the existing SRS region of the slot comprises including non-zero values for ten bits when communications between the UE and a base station are code-division-multiplexed (CDM) with communications of at least one UE that transmits SRS in the existing SRS region; or
   receiving configuration information from the base station for SRS resources for the SRS transmissions for a plurality of slots, wherein the configuration information indicates resources in the existing SRS region of the plurality of slots or the added SRS region of the plurality of slots or both for SRS transmissions for positioning, and resources in the existing SRS region of the plurality of slots for other SRS transmissions, and transmitting the SRS transmissions according to the configuration information.

2. The method of claim 1, wherein the method includes transmitting the SRS transmissions in the existing SRS region of the slot, using the scrambling sequence ID of greater than ten bits, wherein using the scrambling sequence ID of greater than ten bits for the SRS transmissions in the existing SRS region of the slot comprises including the non-zero values for the ten bits when the communications between the UE and the base station are code-division-multiplexed (CDM) with the communications of the at least one UE that transmits the SRS in the existing SRS region.

3. The method of claim 1, wherein the scrambling sequence ID of greater than ten bits is a scrambling sequence ID of 12 or 16 bits.

4. The method of claim 1, wherein for the SRS transmissions in the existing SRS region of the slot, using the scrambling sequence ID of ten bits.

5. The method of claim 1, wherein the method includes:
receiving the configuration information from the base station for the SRS resources for the SRS transmissions for the plurality of slots, wherein the configuration information indicates the resources in the existing SRS region of the plurality of slots or the added SRS region of the plurality of slots or both for the SRS transmissions for positioning, and the resources in the existing SRS region of the plurality of slots for the other SRS transmissions; and
transmitting the SRS transmissions according to the configuration information.

6. The method of claim 1, wherein the UE receives the configuration information for the SRS resources for transmitting the SRS transmissions for positioning in the existing SRS region of the slot, the added SRS region of the slot or both, and for transmitting the other SRS transmissions in the existing SRS region of the slot or a different slot or both.

7. The method of claim 6, wherein the SRS transmissions for positioning in the added SRS region of the slot use a scrambling sequence ID of sixteen bits and wherein the other SRS transmissions in the existing SRS region of the slot or the different slot or both use a scrambling sequence ID of ten bits.

8. The method of claim 6, wherein the resources for transmitting the SRS transmissions for the positioning include at least one symbol in the existing SRS region of the slot and at least one symbol in the added SRS region of the slot.

9. The method of claim 1, wherein the existing SRS region of the slot includes six symbols and wherein the added SRS region of the slot includes eight symbols.

10. The method of claim 6, wherein the SRS transmissions for the positioning are not configured for frequency domain subband hopping.

11. A method of wireless communication performed by a user equipment (UE) for sounding reference signal (SRS) transmissions, the method comprising:
transmitting SRS transmissions in an added SRS region of a slot, using a comb type of greater than four; and
at least one of:
transmitting the SRS transmissions in an existing SRS region of a slot, using a second comb type of two or four for the SRS transmissions in the existing SRS region when communications between the UE and a base station are code-division-multiplexed (CDM) with communications of at least one UE that transmits SRS in the existing SRS region; or
receiving configuration information from the base station for SRS resources for the SRS transmissions for a plurality of slots, wherein the configuration information indicates resources in the existing SRS region of the plurality of slots or the added SRS region of the plurality of slots or both for the SRS transmissions for positioning, and resources in the existing SRS region of the plurality of slots for other SRS transmissions, and transmitting the SRS transmissions according to the configuration information.

12. The method of claim 11, wherein for the SRS transmissions in the existing SRS region of the slot, using a comb type of two or four.

13. The method of claim 11, wherein the method includes using the comb type of two or four for the SRS transmissions in the existing SRS region when the communications between the UE and the base station are code-division-multiplexed (CDM) with the communications of the at least one UE that transmits the SRS in the existing SRS region.

14. The method of claim 11, wherein the comb type of greater than four includes at least one comb type selected from a group consisting of a comb type of six and a comb type of eight.

15. The method of claim 11, wherein the method includes:
receiving the configuration information from the base station for the SRS resources for the SRS transmissions for the plurality of slots, wherein the configuration information indicates resources in the existing SRS region of the plurality of slots or the added SRS region of the plurality of slots or both for SRS transmissions for the positioning, and resources in the existing SRS region of the plurality of slots for the other SRS transmissions, and
transmitting the SRS transmissions according to the configuration information.

16. The method of claim 11, wherein the UE receives the configuration information for the SRS resources for transmitting the SRS transmissions for positioning in the existing SRS region of the slot, the added SRS region of the slot or both, and the SRS resources for transmitting the other SRS transmissions in the existing SRS region of the slot or a different slot.

17. The method of claim 16, wherein the SRS transmissions for positioning in the added SRS region of the slot use a comb type of 2, 4, or 8 and wherein the other SRS transmissions in the existing SRS region of the slot or the different slot use a comb type of 2 or 4.

18. The method of claim 16, wherein the resources for transmitting the SRS transmissions for the positioning include at least one symbol in the existing SRS region of the slot and at least one symbol in the added SRS region of the slot.

19. The method of claim 16, wherein the existing SRS region of the slot includes six symbols and wherein the added SRS region of the slot includes eight symbols.

20. The method of claim 16, wherein the SRS transmissions for the positioning are not configured for frequency domain subband hopping.

21. A user equipment (UE) for wireless communications with sounding reference signal (SRS) transmissions comprising:
memory; and
a processor in communication with the memory, the processor and the memory configured to:
transmit SRS transmissions using a scrambling sequence identifier (ID) of greater than ten bits for SRS transmissions in an added SRS region of a slot; and
transmit the SRS transmissions using use a scrambling sequence ID of greater than ten bits for SRS transmissions in an existing SRS region of a slot;
wherein at least one of:
non-zero values are included for ten bits when communications between the UE and a base station are code-division-multiplexed (CDM) with communications of at least one UE that transmits SRS in the existing SRS region; or
the processor and the memory are configured to receive configuration information from a base station for SRS resources for the SRS transmissions for a plurality of slots, wherein the configuration information indicates resources in the existing SRS region of the plurality of slots or the added SRS region of the plurality of slots or both for SRS transmissions for positioning, and resources in the existing SRS region of the plurality of slots for other SRS transmissions and transmit the SRS transmissions according to the configuration information.

22. The user equipment of claim 21, wherein processor and the memory are configured to include the non-zero values for ten bits when the communications between the UE and the base station are code-division-multiplexed (CDM) with the communications of the at least one UE that transmits the SRS in the existing SRS region.

23. The user equipment of claim 21, wherein the scrambling sequence ID of greater than ten bits is a scrambling sequence ID of 12 or 16 bits.

24. The user equipment of claim 21, wherein for the SRS transmissions in the existing SRS region of the slot, using the scrambling sequence ID of ten bits.

25. The user equipment of claim 21, the processor and the memory configured to:
receive the configuration information from the base station for the SRS resources for the SRS transmissions for the plurality of slots, wherein the configuration information indicates resources in the existing SRS region of the plurality of slots or the added SRS region of the plurality of slots or both for the SRS transmissions for the positioning, and the resources in the existing SRS region of the plurality of slots for the other SRS transmissions, and
transmit the SRS transmissions according to the configuration information.

26. The user equipment of claim 21, wherein the configuration information is for the SRS resources for transmitting the SRS transmissions for positioning in the existing SRS region of a slot, the added SRS region of the slot or both, and for transmitting the other SRS transmissions in the existing SRS region of the slot or a different slot.

27. The user equipment of claim 26, wherein the SRS transmissions for positioning in the added SRS region of the slot use a scrambling sequence ID of sixteen bits and wherein the other SRS transmissions in the existing SRS region of a same slot or the different slot use a scrambling sequence ID of ten bits.

28. A user equipment (UE) for wireless communication with sounding reference signal (SRS) transmissions comprising:
memory; and
a processor in communication with the memory, the processor and the memory configured to:
use a comb type of greater than four for SRS transmissions in an added SRS region of a slot; and
using a second comb type of two or four for SRS transmissions in an existing SRS region when communications between the UE and a base station are code-division-multiplexed (CDM) with communications of at least one UE that transmits SRS in the existing SRS region.

* * * * *